United States Patent
Lonnroth et al.

(10) Patent No.: US 6,826,597 B1
(45) Date of Patent: Nov. 30, 2004

(54) PROVIDING CLIENTS WITH SERVICES THAT RETRIEVE DATA FROM DATA SOURCES THAT DO NOT NECESSARILY SUPPORT THE FORMAT REQUIRED BY THE CLIENTS

(75) Inventors: Magnus M. Lonnroth, Molndal (SE); Roland Svensson, Lindingo (SE); Johan Svensson, Gotheborg (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/454,515

(22) Filed: Dec. 6, 1999

Related U.S. Application Data
(60) Provisional application No. 60/124,774, filed on Mar. 17, 1999.

(51) Int. Cl.[7] .................. G06F 15/16; G06F 15/173; G06F 17/30; G06F 17/00
(52) U.S. Cl. .................. 709/207; 709/223; 709/246; 707/4; 707/5; 707/10; 715/513
(58) Field of Search ................................. 709/246, 223, 709/218, 207, 236; 455/405; 707/4, 5, 10, 102; 715/513

(56) References Cited

U.S. PATENT DOCUMENTS

| | | | | |
|---|---|---|---|---|
| 6,012,098 A | * | 1/2000 | Bayeh et al. | 709/246 |
| 6,125,391 A | * | 9/2000 | Meltzer et al. | 709/223 |
| 6,154,738 A | * | 11/2000 | Call | 707/4 |
| 6,263,332 B1 | * | 7/2001 | Nasr et al. | 707/5 |
| 6,301,471 B1 | * | 10/2001 | Dahm et al. | 455/405 |
| 6,317,783 B1 | * | 11/2001 | Freishtat et al. | 709/218 |
| 6,334,126 B1 | * | 12/2001 | Nagatomo et al. | 707/4 |
| 6,397,217 B1 | * | 5/2002 | Melbin | 707/10 |
| 6,397,259 B1 | * | 5/2002 | Lincke et al. | 709/236 |
| 6,401,132 B1 | * | 6/2002 | Bellwood et al. | 709/246 |
| 6,477,549 B1 | * | 11/2002 | Hishida et al. | 715/513 |
| 6,480,860 B1 | * | 11/2002 | Monday | 707/102 |

FOREIGN PATENT DOCUMENTS

EP    0 987 868 A2    2/2000    ........... H04L/29/06

OTHER PUBLICATIONS

Kirkrelis, A: "Mobile multimedia: shaping the Infoverse", IEEE Concurrency, Online! vol. 7, No. 1, Jan. 1, 1999–Mar. 1, 1999, pp. 7–9, XP002145579 Brunel Univ., Uxbridge, UK ISSN: 1092–3063.

Alves Dos Sandos, L.M.: "multimedia data and tools for web servies over wireless platforms" IEEE Personal Communications, Online! vol. 5, No. 5, –Oct. 1998 pp. 42–46 XP002145580 German ISSN: 1070–9916.

* cited by examiner

*Primary Examiner*—Joseph Feild
*Assistant Examiner*—Chau Nguyen
(74) *Attorney, Agent, or Firm*—David Lewis; Hickman Palermo Truong & Becker LLP (57) ABSTRACT

A method and system for allowing clients to retrieve data from data sources that do not necessarily support the same protocols and formats as the clients. The clients issue service requests. A pre-processor responds to the requests by generating XML-structured request objects with unresolved links to the data sources that have information required by the clients. An XML processor resolves the links by issuing requests through one or more gateways. The gateways convert the responses received from the data sources into XML, which the XML processor uses to create XML composite response documents. A post-processor filters the XML response documents, and applies XSL stylesheets to transform the XML composite response documents into client-specific responses that conform to the format required by the clients. The client-specific responses are then sent to the clients.

37 Claims, 3 Drawing Sheets

PROVIDING CLIENTS WITH SERVICES THAT RETRIEVE DATA FROM DATA SOURCES THAT DO NOT NECESSARILY SUPPORT THE FORMAT REQUIRED BY THE CLIENTS

RELATED APPLICATION; PRIORITY CLAIM

This application is related to and claims domestic priority under 35 U.S.C. § 119(e) from prior Provisional Application Ser. No. 60/124,774, filed Mar. 17, 1999, entitled "SINGLE APPLICATION TO SERVICE AN ARBITRARY CLIENT," and naming as inventors MAGNUS M. LONNROTH, ROLAND SVENSSON and JOHAN SVENSSON, the entire disclosure of which is hereby incorporated by reference as if fully set forth herein.

FIELD OF THE INVENTION

The present invention relates to providing services to clients and, more specifically, to providing clients with services that retrieve data from data sources that do not necessarily support the format required by the clients.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser.

Another trend is to expand Internet access to devices other than conventional computer systems. For example, wireless phones have been developed that include embedded web browsers. Due to size and cost constraints, the "micro browsers" contained in these devices have very limited functionality relative to the browsers that have been developed for full-fledged computer systems. However, devices with embedded micro browsers are usable in circumstances under which using a conventional computer system is impractical. In addition to having an embedded micro browser, certain wireless phones support a two-way paging protocol known as Short Message Stimulator (SMS). Using SMS, an SMS-enabled phone may send a text message to another SMS-enabled phone.

Figure 1:
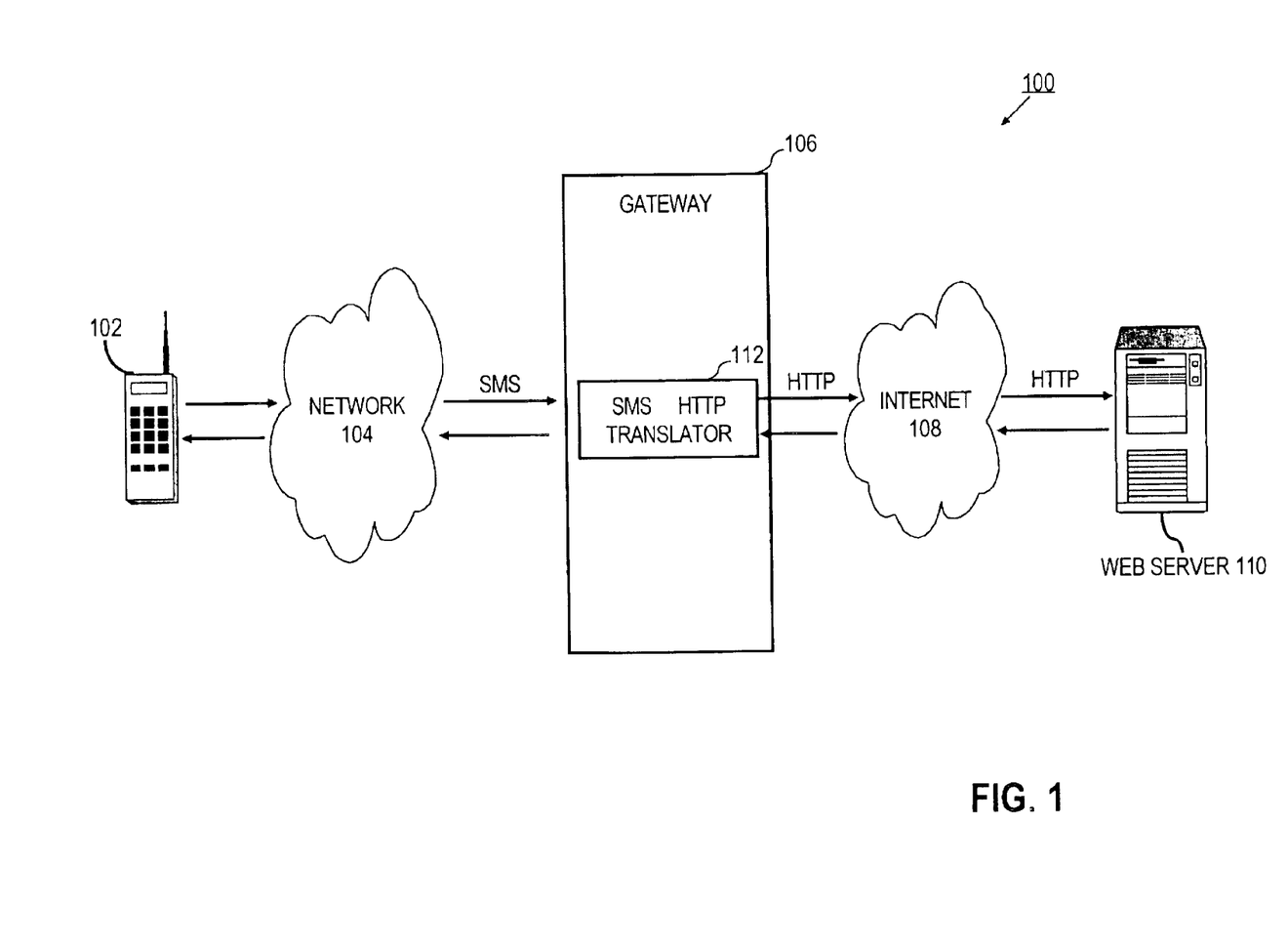
FIG. 1 is a block diagram of a system that allows mobile phones to communicate with web servers.

A typical system in which web-enabled, SMS-enabled phones may be used is illustrated in FIG. 1. Referring to FIG. 1, system 100 includes a wireless phone 102 connected to a network 104 though a wireless communication medium. Network 104 may be, for example, a global digital network such as the Global System for Mobile Communications (GSM) network. SMS messages from the phone 102 may be sent through the network 106 to a gateway 106 that includes a translator 112. Gateway 106 may be, for example, a NAMP server, available from Nokia, that is configured to translate SMS messages to HTTP messages that can be sent over an IP network. In the illustrated embodiment, gateway 106 translates SMS messages from phone 102 and transmits them using HTTP over the Internet 108 to a web server 110.

In response to the HTTP request from gateway 106, web server 110 sends a web page back over the Internet 108 to gateway 106. Gateway 106 converts the web page to an SMS message and sends it to phone 102 through network 104. Unfortunately, due to the limited capabilities of phone 102, the process of intelligently converting the web page into something that can be delivered to the phone 102 can be extremely difficult.

According to one approach, gateway 106 includes filtering logic that is programmed with web-page-specific filtering rules. Such a filtering rule may indicate, for example, that text that is to be included in the SMS message sent back to the phone 102 is to be obtained by extracting the 53 characters that follow a particular sequence of tags within the web page associated with the rule. The rule for a different web page could specify completely different criteria for located and extracting text. Even for the same web page, a particular filtering rule may cease to yield the desired result if the content or format of the web page changes. Consequently, using the web-page-specific filtering rule approach places an enormous burden on the manager of gateway 106 to design the various filter rules and to keep them up to date for all pages that will be requested through gateway 106.

In an alternate approach, the filtering functionality is moved outside of gateway 106 into a filtering box that is placed between the gateway 106 and the Internet 108. The gateway 106 continues to believe that it is interacting with the web servers over the Internet 108, and continues to translate between HTTP and SMS. However, all HTTP traffic sent to or sent from gateway 106 actually passes through the filtering box. The filtering rules applied by the filtering box may be specified by users themselves. Thus, the filtering box may filter the same web page differently for different phone users based on how those phone users have designed their filters. While this approach reduces the managerial burden of the gateway administrator, it largely shifts that burden to the users themselves. Further, it only allows the phones to communicate with one type of data source: HTTP servers. Other information sources, such as database systems, are not made accessible to phone 102 by the gateway 106.

Based on the foregoing, it is clearly desirable to improve the techniques by which users of less-conventional clients gain access to the World Wide Web. It is further desirable to provide techniques that allow such clients to conveniently access other sources of information.

SUMMARY OF THE INVENTION

A method and system are provided for allowing clients to retrieve data from data sources that do not necessarily support the same protocols and formats as the clients. According to one aspect of the invention, a pre-processor responds to the service requests of clients by generating request objects. In one embodiment, the request objects are XML-structured documents with unresolved links to the data sources that have information required by the clients. An XML processor resolves the links by issuing requests through one or more gateways. The gateways convert the responses received from the data sources into XML, which the XML processor uses to create XML composite response documents. A post-processor filters the XML response documents, and applies XSL stylesheets to transform the XML composite response documents into client-specific responses that conform to the format required by the clients. The client-specific responses are then sent to the clients.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system for allowing an arbitrary client to be serviced by a single application is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

SYSTEM OVERVIEW

Figure 2:
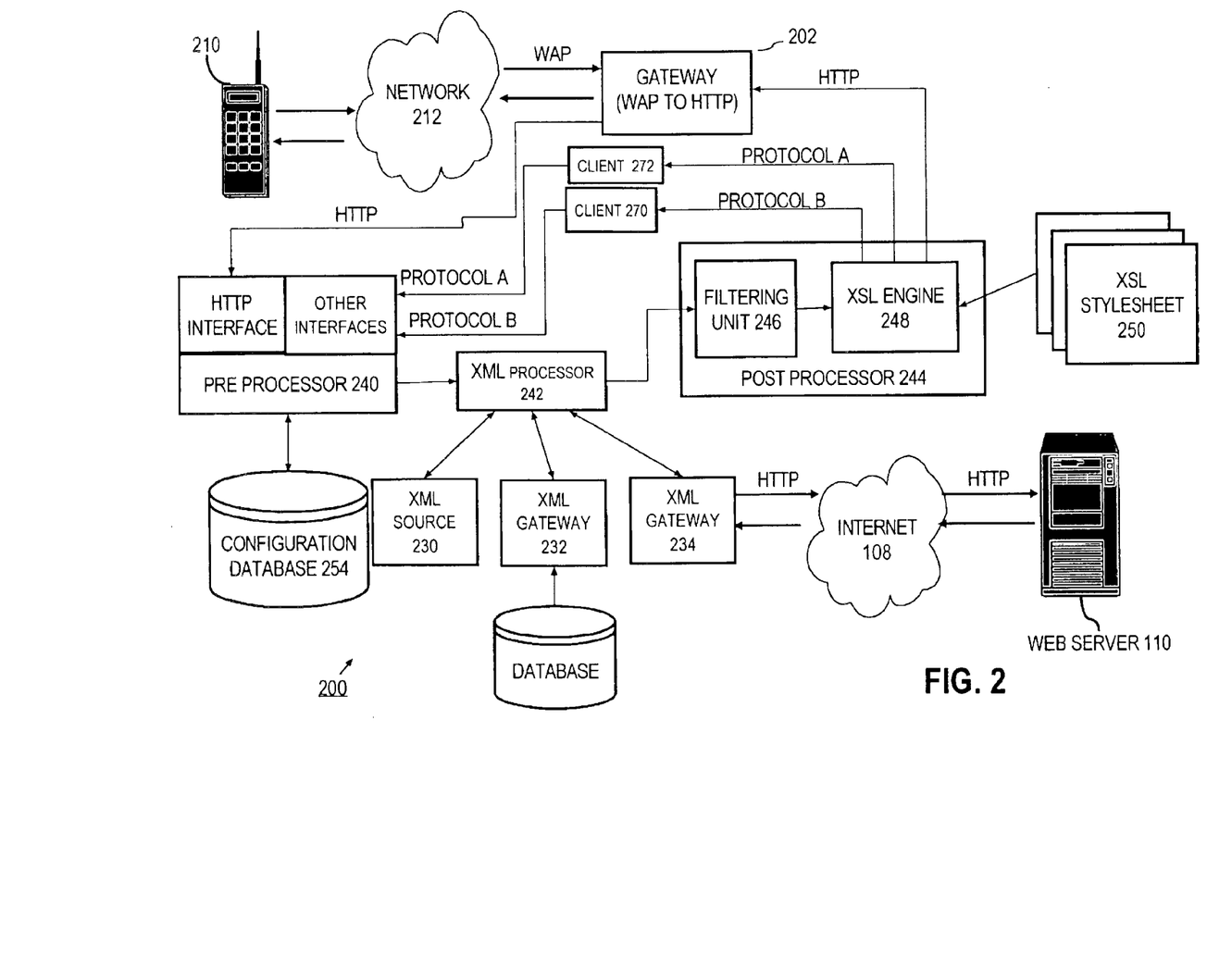
FIG. 2 is a block diagram of a system configured according to an embodiment of the invention.

FIG. 2 is a block diagram that illustrates a system 200 that implements an embodiment of the invention. System 200 is similar to system 100 in that it includes a mobile device (phone 210) that communicates with a gateway 202 over a network 212. According to one embodiment, phone 210 is a WAP phone that is configured to support the display of WML pages. In such an embodiment, gateway 202 could, for example, be a WAP gateway configured to communicate with phone 210 by sending WML pages through network 204 using the WAP protocol.

System 200 further includes a pre-processor 240, an XML processor 242, and a post processor 244. In general, pre-processor 240 receives requests and from clients and generates request objects based thereon. In one embodiment, those request objects take the form of XML documents. Those XML document "requests" are forwarded to XML processor 242 which obtains XML documents from one or more XML sources to which XML processor 242 is connected. As shall be described in greater detail hereafter, those XML sources may include one or more gateways connected to non-XML sources. The XML documents that are created in response to the requests are passed to post processor 244 to be filtered and formatted according to the needs of the requesting entity. The conversion operation performed by post processor 244 is driven by XSL style sheets 250. Documents produced by post processor 244 are then delivered to the requesting entity.

Each of the entities within system 200, and the operations thereof, shall now be described in greater detail.

SERVICE REQUESTS

Clients send requests to pre-processor 240. The nature and format of the requests will vary based on the type of the client. Each service request identifies the service that is requested, and may include any number of parameter values associated with the request. The services specified in the service requests that pre-processor 240 receives from clients may vary widely in complexity. For example, one service may simply involve obtaining a particular piece of information from a single Web site. Yet another service may involve running searches against hundreds of Web sites, updating numerous databases based on the results of the searches, and transmitting email messages to hundreds of users to inform them that the database has been updated.

According to one embodiment, services may be defined as collections of other services. By allowing services to be defined to include other services, an arbitrarily complex hierarchy of services may be supported. For example, a first service may be established for tracking packages sent by UPS. A second service may be established for tracking packages sent by FedEx. A third service may be established as a combination of the first and second services. A fourth service may be established to perform the third service and update a database to reflect the results produced by the third service.

According to an embodiment, the set of services made available to clients varies on a per-user basis. Thus, the set of services that may be requested by one client may be different than the services requested by another client. In addition, certain services may be defined on a per-user basis. For example, a particular user may define a particular service to be the combination of three existing services. Data about each user-defined services is stored and made accessible to pre-processor 240 so that pre-processor 240 knows how to handle requests for those services. According to one embodiment, the services available to each user, including user-defined services, are defined in a configuration database 254 that is accessible to pre-processor 240.

THE PRE-PROCESSOR

Pre-processor 240 is configured to receive and process requests from clients. The protocols supported by pre-processor 240 dictate the form in which the requests must be received, and will vary from implementation to implementation. The present invention is not limited to any particular type or number of protocols supported by pre-processor 240. In the illustrated embodiment, pre-processor 240 supports HTTP and as well as two other protocols (shown as protocol A and protocol B). Through its support for HTTP requests, pre-processor 240 appears as a web server to gateway 202, and is therefore able to receive HTTP requests that originated as WAP requests issued from WAP-enabled devices.

Upon receiving a service request, the pre-processor 240 performs any operations that are required prior to servicing the request. Such operations may include, for example, performing security checks to determine whether the client issuing the request is authorized to issue the request. According to one embodiment, information about which services are authorized for each client are stored in configuration database 254.

According to one embodiment, the pre-processor 240 also generates, based on the request and information contained in configuration database 254, a request object in the form of an XML document. Specifically, the pre-processor 240 searches configuration database 254 to determine how to construct the XML document. The search may be performed, for example, based on the phone number and user id associated with the service request. The information contained in configuration database for that phone number/user-id combination may specify, for example, links to the information sources that correspond to the requested service, user preferences, etc. The XML document generated by pre-processor 240 in response to a service request is referred to herein as a XML request document. The XML request document includes links that identify the information sources that correspond to the requested service. As shall be described in greater detail hereafter, the XML document may also include metadata, inserted by the pre-processor 240, that is used by the various components of post processor 244.

For the purpose of illustration, it shall be assumed that pre-processor 240 receives a request that originated from phone 210, that phone 210 is a WAP phone, and that the request is for a service that determines the status of all of a particular user's packages. Upon verifying that phone 210 is authorized to make the request, pre-processor 240 generates an XML request document. In the present example, the resulting XML request document may include, for example, a link to a UPS package tracking web site, a link to a FedEx package tracking web site, etc. The XML request document thus created is then passed to the XML processor 242.

THE XML PROCESSOR

Upon receiving an XML request document from XML preprocessor 240, XML processor 242 parses the XML request document. When the XML processor 242 encounters unresolved links within the XML request document, XML processor 242 resolves the links, typically by making calls through one or more XML gateways.

XML gateways are mechanisms for converting between XML and messages produced by other types of data sources. For example, one XML gateway may be for the World Wide Web, and therefore convert between XML and HTML messages. Another XML gateway may be for a database system, and therefore convert between XML and the protocol supported by the database system. Yet another XML gateway may be for a mainframe computer, and convert between XML and the message protocol supported by the mainframe computer. The illustrated system 200 includes two XML gateways 232 and 234. XML gateway 232 is configured to convert between XML and a protocol used by a database system. XML gateway 234 is configured to convert between XML and HTTP messages on the World Wide Web.

The XML gateways that are called by XML processor 242 in response to a particular XML request document are the XML gateways that are connected to the data sources that have the information identified in the XML request document. For example, assume that the UPS and FedEx package-tracking information is available over the World Wide Web. In response to an XML request document to determine the status of a user's packages, XML processor 242 makes calls to gateway 234. Gateway 234 converts those requests into HTTP messages that request the required information from the appropriate sites on the World Wide Web. In response to the HTTP requests, the information is supplied from those Web sites back to the XML gateway 234 in the form of one or more HTML documents. Gateway 234 converts the HTML documents to XML documents and supplies the XML documents to XML processor 242. XML documents that are supplied to XML processor 242 in response to XML requests are referred to herein as XML response documents. XML processor 242 forwards XML response documents to post processor 244.

According to one embodiment, for each XML request, the XML processor 242 creates a single "composite" XML response document by replacing links in the XML request with the XML response documents received from the entities that correspond to the links. For example, assume that the XML request document initially included one link to the UPS package tracking web site and one link to the FedEx package tracking web site. In response to receiving the XML request document, XML processor 242 would resolve each of the links in the XML request document by sending requests to those web sites through XML gateway 234. Those web sites respond to the requests using HTTP responses that are converted by gateway 234 into XML response documents.

The XML request is then transformed by the XML processor 242 into a composite XML response document based on the information received back from those web sites. Specifically, the information received from the UPS package tracking Web site is converted to XML by XML gateway 234 and passed to XML processor 242. XML processor 242 then replaces the link to the UPS package tracking Web site in the XML request document with the information (now in XML format) received from the UPS package tracking Web site. Similarly, the information received from the FedEx package tracking Web site is converted to XML by XML gateway 234 and passed to XML processor 242. XML processor 242 then replaces the link to the FedEx package tracking Web site in the XML request document with the information (now in XML format) received from the FedEx package tracking Web site. The XML request document is transformed into a composite XML response document by virtue of these replacements. The composite XML response document produced by this process is passed from the XML processor 242 to post processor 244.

In the package-tracking example, the service involved obtaining information from multiple sources that support the same protocol (i.e. multiple web sites). However, XML processor 242 may be connected to any number of different gateways, and a single service may involve obtaining information from multiple devices through multiple gateways. For example, a particular service may involve resolving one link by obtaining information from a web site through gateway 234, and resolving a different link by obtaining information from a database through gateway 232. Both the information from the web site and the information from the database are converted into XML, which is used to replace the corresponding links within the XML request document. Consequently, the composite XML response document may include, in XML structure, information obtained from sources that support very different formats and protocols.

THE POST-PROCESSOR

The post-processor 244 receives XML responses from the XML processor. According to one embodiment, post-processor 244 includes a filtering unit 246 and an XSL engine 248. In general, the filtering unit 246 selectively filters the XML response documents based on filtering rules, and the XSL engine 248 transforms the XML response documents, based on XSL stylesheets, to the format, layout, and document type desired for the client for which the response is destined. The operations of these components are described in greater detail hereafter.

THE FILTERING UNIT

Filtering unit 246 receives the composite XML response documents from XML processor 242 and selectively removes content from those documents. For example, assume that a client issues a request for information on the World Wide Web about used cars for sale, and that the request is for a specific year, model and color of car. An XML request is generated by pre-processor 240 based on the request, and passed to XML processor 242. XML processor makes calls to an XML gateway connected to the World Wide Web and configured to translate between HTML and XML (e.g. XML gateway 234). The XML gateway issues HTTP requests to one or more Web sites that contain used car sales information. For the purpose of illustration, assume that the search engines at those Web sites are able to search based on year and model criteria, but although the Web sites are able to supply color information, the search engines do not support color as a search criteria.

The XML gateway 234 receives the responses back from the. Web sites, typically in the form of HTML pages, and generates XML response documents that contain the content of those HTML pages. In the present example, the XML response documents would include information about all cars that satisfied the specified year and model criteria, regardless of their color. The XML response documents are incorporated into the XML request document to create the composite XML response which is received by filtering unit 246. Filtering unit 246 filters the composite XML response based on the color specified in the initial request. The resulting "filtered" XML response includes information on only those cars that satisfy the color, year and model criteria

XSL STYLE SHEETS

XSL style sheets contain instructions about how each type of data item that can be contained in an XML document should be formatted prior to transmission to the client. For example, an XSL style sheet may indicate that a particular type of data item (e.g. all "employee" fields) should be displayed in a particular font type, font size, and color, with left justification. The formatting and layout rules contained in an XSL style sheet may incorporate logic and conditional branches. For example, an XSL style sheet may specify that all "employee" fields are displayed in red if the employee age is over 50, in blue if between 20 and 50, and in green if under 20. The rules may take into account the context of data items as well. For example, an XSL rule may specify that employee information is displayed as a table if the employee information is part of a purchase order.

According to one embodiment, each type of client device is associated with a corresponding, static, XSL style sheet. The XSL style sheet associated with a device includes general instructions about how data should be formatted for the device. Alternatively, separate XSL style sheets may exist for each service for each device. Further, user's may be allowed to customize their services, resulting in separate XSL style sheets per user per service per device. Alternatively, XSL stylesheets may be generated on-the-fly, rather than statically. For example, an XSL stylesheet may be generated based on a service definition in response to the service thus defined being requested by a particular user using a particular type of client device.

According to one aspect of the invention, the commands contained in XSL style sheets 250 are expanded beyond formatting and layout instructions to include transformation rules that cause the XML document to be transformed into another type of document or message. For example, an XSL style sheet may contain instructions for transforming XML documents into HTML documents. Another XSL style sheet may contain instructions for transforming XML documents into WML documents. Yet another XSL style sheet may contain instructions for transforming XML documents into .pdf documents. The entity responsible for applying XSL style sheets to XML documents is the XSL engine 248, which shall now be described.

THE XSL ENGINE

XSL engine 248 receives the filtered XML responses from the filtering unit 246, determines the XSL style sheets that apply to the XML document, and uses the information in the applicable style sheets to convert the XML document into the format required by the client to which the document is to be sent. The format of the resulting document will vary based on the XSL style sheets that are applied to the XML document by the XSL engine 248.

In the case that the information request originated with a WAP enabled device, the selected XSL style sheet causes the XML document to be converted into a WML document to be sent to according to the WAP protocol to the WAP device. The XSL stylesheets associated with other types of transformations would be used for other types of devices. For example, if the initial request came from a Web browser, then XSL engine 248 would apply an XSL stylesheet that transforms XML documents into HTML, and transform the composite XML response to an HTML document to be sent using HTTP to the requesting client.

METADATA

According to one embodiment, information about the client and the service requested is passed from pre-processor 240 to XML processor 242 to post processor 244 in the form of metadata within the XML request/composite response document. In general, the metadata includes information that drives the operation of the various components. For example, the metadata may contain data that identifies the particular client that issued a request, the device type of the client, the protocol supported by that client, the user currently using the client, the service requested by the client, and various parameters associated with the requested service.

The parameters associated with a request, such as the criteria specified in a search, may be used by filtering unit 246 to determine what information to filter from the composite XML response. The device type of the client, the protocol supported by the client, and the identity of the user that is using the client may all be used by XSL engine 248 to determine which stylesheets to apply to the filtered XML response. The identity of the particular client may be used by the post processor 244 to determine where to send the response documents produced by XSL engine 248.

According to one embodiment, the metadata associated with a request is embedded by pre processor 240 in the XML request objects generated by pre-processor 240. As the XML request objects are passed from pre processor 240 to XML processor 242 to be transformed into composite XML responses, the metadata is included. Similarly, the metadata is included as the composite XML responses are passed from the XML processor 242 to the filtering unit 246, and as the filtered XML responses are passed to the XSL engine 248.

SERVICE DEFINITION

According to one embodiment, the administrator of XML processor 242 communicates the gateways and data sources available to the XML processor 242, and allows clients to define their own custom services. The custom services thus defined are stored in the configuration database 254.

Various mechanisms may be used to allow the creation of user-customized services. For example, the gateways and data sources available to XML processor 242 may be communicated in the form of service object templates, where each service object template corresponds to a service provided by the XML processor 242. The user may then modify the service object template by supplying user-specific information, for example, the user's frequent flyer number and the airlines preferred by the user. The service object template may then be stored in the configuration database 254 to allow the user-customized service thus defined to be requested by that particular user.

By allowing users to create customized services in this manner, users may avoid having to enter certain information every time they issue a request for the service. This is particular helpful when the device through which they are issuing the service request does not have a user interface that supports easy data entry. For example, it would be onerous for a user to enter a frequent flyer number into a cell phone user interface every time the user desires to book a flight using the cell phone.

ARBITRARY-CLIENT APPLICATIONS

Typically, client-server software applications are designed for specific clients. For example, a software application that generates its user interfaces by making calls to a particular operating system can only be used by clients that support that operating system. Similarly, a software application that generates its user interfaces in HTML can be used with clients that can execute conventional browsers.

According to one aspect of the invention, the document conversion techniques described above are employed to allow software applications to work with any type of client for which XSL stylesheets may be defined. For the purpose of explanation, applications thus configured are referred to herein as arbitrary-client applications.

Referring again to system 200, any application that generates its user interface in XML constitutes an XML source, such as XML source 230. Such applications can be used by any client for which an XSL stylesheet has been created, since the XML interface document can be formatted by XSL engine 248 for display on any such client. Further, any applications that generate a user interface that, while not in XML format, can be converted to XML format by an XML source, also qualify as arbitrary-client applications when used in conjunction with system 200.

Arbitrary-client applications have a significant advantage over other types of applications in that the arbitrary-client application developer need not create different versions of the application for each of the different clients that will be used to operate the application. For example, the exact same application code may be controlled by a WML-enabled phone, a workstation-based web browser, and a set-top box.

XML-BASED APPLICATIONS

In the description given above, data is retrieved from data sources that do not themselves generate XML, and gateways are used to convert the data to XML. However, data sources may be designed to directly generate XML. For such XML-based applications, no gateway would be required. Rather, XML processor 242 can be configured to interact with them directly. In FIG. 2, XML source 230 represents such an XML-based application.

HARDWARE OVERVIEW

Figure 3:
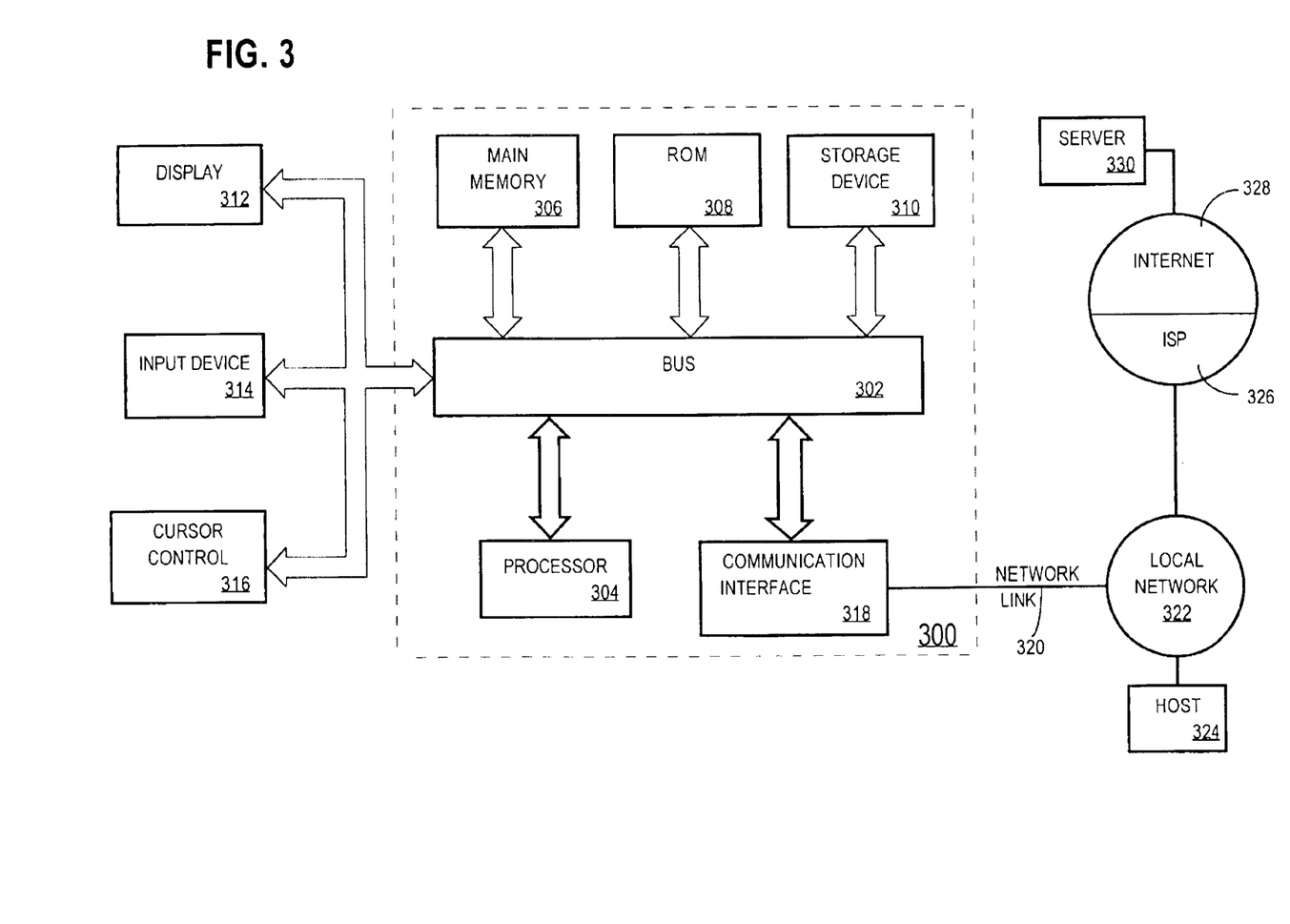
FIG. 3 is a block diagram of a computer system that may be used to implement embodiments of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the inevntion. The specification and drawings are, accordingly, to be regarded in an illustrative rather than a restrictive sense.

What is claimed is:

1. A method for retrieving information from one or more data sources, the method including the steps of:
   receiving, from a particular type of client, a request for a service;
   wherein said request for said service is received at a system located separately from said client;
   wherein said request is sent by a particular user;
   within said system generating, based on a first set of parameters, a request object;
   wherein said first set of parameters includes identity of said service;
   based on said request object, said system transmitting requests to one or more data sources;
   at said system receiving responses to said requests from said one or more data sources in one or more formats other than a particular format;
   at said system converting said responses into said particular format;
   at said system generating, based on said responses, a composite response document in said particular format;
   at said system transforming said composite response document into a client-formatted response based on a second set of parameters;
   wherein said second set of parameters includes identity of said particular type of client; and
   at said system transmitting said client-formatted response to said particular user.

2. The method of claim 1 further comprising the steps of embedding within said request object one or more filtering criteria, and
   filtering data from said composite response document based on said filtering criteria prior to transforming said composite response document.

3. The method of claim 2 wherein
   one of said requests invokes a search mechanism at a data source based on a first set of search criteria; and
   the step of filtering data includes filtering data that originated from said data source based on a second set of search criteria.

4. The method of claim 1 wherein said first set of parameters for generating said request object includes identity of said particular user.

5. The method of claim 1 wherein:
   the step of generating the request object includes generating filtering criteria; and
   the method includes filtering data from the composite response document based on the filtering criteria before transforming the composite response document.

6. The method of claim 1 wherein:
   the step of receiving responses to said requests from said one or more data sources in one or more formats other than a particular format involves receiving responses to said requests from said one or more data sources in one or more formats other than XML;
   the step of converting said responses into said particular format involves converting responses into XML;
   the step of generating a composite response document in said particular format involves generating a composite response document in XML; and
   the step of transforming said composite response document into a client-formatted response involves transforming said composite response document into a format other than XML.

7. The method of claim 6 wherein the step of transforming includes:
   identifying one or more XSL stylesheets based on said second set of parameters; and
   applying said one or more XSL stylesheets to said composite response document.

8. The method of claim 1 wherein:
   said one or more data sources include
      a first data source that supports a first protocol and is accessible through a first gateway, and
      a second data source that supports a second protocol and is accessible through a second gateway; and
   the step of converting said responses into said particular format includes
      said first gateway converting a response from said first data source to said particular format; and
      said second gateway converting a response from said second data source to said particular format.

9. The method of claim 8 wherein at least one of said first data source and said second data source is a database system.

10. The method of claim 8 wherein at least one of said first data source and said second data source is an HTTP server.

11. The method of claim 10 wherein the client-formatted response is an HTML document.

12. The method of claim 6 wherein:
    the step of generating a request object involves generating an XML request document that includes unresolved links; and
    the step of transmitting requests involves resolving said unresolved links.

13. The method of claim 12 wherein the step of generating said composite response document involves replacing said unresolved links in said XML request document with XML data generated based on said responses from said one or more data sources.

14. The method of claim 1 wherein said particular type of client is a mobile phone.

15. The method of claim 1 wherein:
    the method further comprises the steps of
       receiving data that indicates user-specific customizations to services;
       storing said data in a configuration database;
       searching said configuration database for said user-specific customizations in response to receiving said request for said service;

said first set of parameters used to generate said request object includes said user-specific customizations.

16. The method of claim 1 wherein:
said one or more data sources include
a first web site accessible through a gateway, and
a second web site accessible through said gateway; and
the step of converting said responses into said particular format includes
said gateway converting a first response from said first web site to said particular format; and
said gateway converting a second response from said second web site to said particular format.

17. A system for transferring information between devices, the system comprising:
a request preprocessor, which is located separately from clients, configured to receive service requests from said clients,
generate request objects for said service requests, and pass said request objects to a request processor, which is located separately from said clients;
said request processor operatively coupled to said request preprocessor and to one or more gateways, said request processor being configured to respond to said request objects by transmitting requests to data sources through said one or more gateways;
said one or more gateways operatively coupled between said request processor and said data sources, said one or more gateways being configured to translate between a particular format and one or more other formats,
convert said requests to said one or more other formats prior to issuing said requests to said data sources,
convert responses from said data sources to said particular format, and
pass said responses in said particular format to said request processor;
wherein said request processor is further configured to generate composite response documents in said particular format based on said responses, and to pass said composite response documents to a post processor;
said post processor operatively coupled to said request processor, said post processor being configured to
transform said composite response documents from said particular format to client-specific responses having formats required by clients, and
transmit said client-specific response documents to said clients.

18. The system of claim 17 wherein said particular format is XML.

19. The system of claim 18 wherein the request objects are XML documents.

20. The system of claim 18 wherein the post processor includes an XSL engine that transforms said composite response documents by
selecting one or more XSL stylesheets based on a first set of parameters, said first set of parameters including type of the clients; and
applying said one or more XSL stylesheets.

21. The system of claim 17 wherein the pre-processor generates the request objects based on a particular set of parameters, said particular set of parameters including identity of users that submit said service requests.

22. A computer-readable medium bearing instructions for retrieving information from one or more data sources, the computer-readable medium including instructions for performing the steps of:

receiving, from a particular type of client, a request for a service;
wherein said request for said service is received at a system located separately from said client;
wherein said request is sent by a particular user;
within said system generating, based on a first set of parameters, a request object;
wherein said first set of parameters includes identity of said service;
based on the request object, said system transmitting requests to one or more data sources;
at said system receiving responses to said requests from said one or more data sources in one or more formats other than a particular format;
at said system converting said responses into said particular format;
at said system generating, based on said responses, a composite response document in said particular format;
at said system transforming said composite response document into a client-formatted response based on a second set of parameters;
wherein said second set of parameters includes identity of said particular type of client; and
at said system transmitting said client-formatted response to said particular user.

23. The computer-readable medium of claim 22 wherein said first set of parameters for generating said request object includes identity of said particular user.

24. The computer-readable medium of claim 22 wherein:
the step of generating the request object includes generating filtering criteria;
the computer-readable medium includes instructions for filtering data from the composite response document based on the filtering criteria before transforming the composite response document.

25. The computer-readable medium of claim 22 wherein:
the step of receiving responses to said requests from said one or more data sources in one or more formats other than a particular format involves receiving responses to said requests from said one or more data sources in one or more formats other than XML;
the step of converting said responses into said particular format involves converting responses into XML;
the step of generating a composite response document in said particular format involves generating a composite response document in XML; and
the step of transforming said composite response document into a client-formatted response involves transforming said composite response document into a format other than XML.

26. The computer-readable medium of claim 25 wherein the step of transforming includes:
identifying one or more XSL stylesheets based on said second set of parameters; and
applying said one or more XSL stylesheets to said composite response document.

27. The computer-readable medium of claim 22 wherein:
said one or more data sources include
a first data source that supports a first protocol and is accessible through a first gateway, and
a second data source that supports a second protocol and is accessible through a second gateway; and
the step of converting said responses into said particular format includes said first gateway converting a response from said first data source to said particular format; and said second gateway converting a response from said second data source to said particular format.

28. The computer-readable medium of claim 27 wherein at least one of said first data source and said second data source is a database system.

29. The computer-readable medium of claim 27 wherein at least one of said first data source and said second data source is an HTTP server.

30. The computer-readable medium of claim 29 wherein the client-formatted response is an HTML document.

31. The computer-readable medium of claim 25 wherein:

the step of generating a request object involves generating an XML request document that includes unresolved links; and the step of transmitting requests involves resolving said unresolved links.

32. The computer-readable medium of claim 31 wherein the step of generating said composite response document involves replacing said unresolved links in said XML request document with XML data generated based on said responses from said one or more data sources.

33. The computer-readable medium of claim 22 wherein said particular type of client is a mobile phone.

34. The computer-readable medium of claim 22 wherein:

the computer-readable medium further comprises instructions for performing the steps of receiving data that indicates user-specific customizations to services;

storing said data in a configuration database;

searching said configuration database for said user-specific customizations in response to receiving said request for said service;

said first set of parameters used to generate said request object includes said user-specific customizations.

35. The computer-readable medium of claim 22 wherein:

said one or more data sources include a first web site accessible through a gateway, and a second web site accessible through said gateway; and the step of converting said responses into said particular format includes said gateway converting a first response from said first web site to said particular format; and said gateway converting a second response from said second web site to said particular format.

36. The method of claim 1 wherein:

said one or more data sources include a plurality of data sources; and said composite response document reflects information from each of said plurality of data sources.

37. The computer-readable medium of claim 22 wherein:

said one or more data sources include a plurality of data sources; and said composite response document reflects information from each of said plurality of data sources.

* * * * *